United States Patent
Tatar et al.

(10) Patent No.: US 9,846,658 B2
(45) Date of Patent: Dec. 19, 2017

(54) DYNAMIC TEMPORARY USE OF PACKET MEMORY AS RESOURCE MEMORY

(71) Applicants: Mohammed Ismael Tatar, Kanata (CA); Promode Nedungadi, San Jose, CA (US); Naader Hasani, San Jose, CA (US); John C. Carney, Lexington, MA (US)

(72) Inventors: Mohammed Ismael Tatar, Kanata (CA); Promode Nedungadi, San Jose, CA (US); Naader Hasani, San Jose, CA (US); John C. Carney, Lexington, MA (US)

(73) Assignee: Cisco Technology, Inc., San Jose, CA (US)

( * ) Notice: Subject to any disclaimer, the term of this patent is extended or adjusted under 35 U.S.C. 154(b) by 309 days.

(21) Appl. No.: 14/257,430

(22) Filed: Apr. 21, 2014

(65) Prior Publication Data

US 2015/0301963 A1    Oct. 22, 2015

(51) Int. Cl.
*H04L 12/28* (2006.01)
*G06F 13/16* (2006.01)
*H04L 12/861* (2013.01)

(52) U.S. Cl.
CPC ...... *G06F 13/1673* (2013.01); *H04L 49/9005* (2013.01)

(58) Field of Classification Search
CPC ....... G06F 13/1673; G06F 5/10; H04L 49/00; H04L 49/9005
See application file for complete search history.

(56) References Cited

U.S. PATENT DOCUMENTS

| 7,088,731 | B2 * | 8/2006 | Iny | H04L 47/10 370/413 |
| 7,124,245 | B1 * | 10/2006 | Walton | G06F 12/0866 711/113 |
| 7,565,496 | B2 | 7/2009 | Shoham et al. | |
| 7,606,250 | B2 * | 10/2009 | Shoham | H04L 41/0893 370/351 |
| 7,669,189 | B1 * | 2/2010 | Umamageswaran | G06F 11/3471 711/100 |

(Continued)

*Primary Examiner* — Wutchung Chu
*Assistant Examiner* — Berhanu Belete
(74) *Attorney, Agent, or Firm* — The Law Office of Kirk D. Williams

(57) ABSTRACT

In one embodiment, packet memory and resource memory of a memory are independently managed, with regions of packet memory being freed of packets and temporarily made available to resource memory. In one embodiment, packet memory regions are dynamically made available to resource memory so that in-service system upgrade (ISSU) of a packet switching device can be performed without having to statically allocate (as per prior systems) twice the memory space required by resource memory during normal packet processing operations. One embodiment dynamically collects fragments of packet memory stored in packet memory to form a contiguous region of memory that can be used by resource memory in a memory system that is shared between many clients in a routing complex. One embodiment assigns a contiguous region no longer used by packet memory to resource memory, and from resource memory to packet memory, dynamically without packet loss or pause.

19 Claims, 4 Drawing Sheets

(56) References Cited

U.S. PATENT DOCUMENTS

| | | | |
|---|---|---|---|
| 7,975,260 B1* | 7/2011 | Conover | G06F 9/44563 |
| | | | 711/153 |
| 8,184,540 B1* | 5/2012 | Perla | H04L 47/568 |
| | | | 370/235 |
| 9,256,380 B1* | 2/2016 | Daniel | H04L 49/30 |
| 9,262,225 B2* | 2/2016 | Davis | H04L 45/60 |
| 2002/0181481 A1* | 12/2002 | Iny | H04L 45/00 |
| | | | 370/395.31 |
| 2003/0037178 A1* | 2/2003 | Vessey | G06F 9/54 |
| | | | 719/319 |
| 2003/0093625 A1* | 5/2003 | Beukema | G06F 12/1081 |
| | | | 711/147 |
| 2004/0090976 A1* | 5/2004 | Shung | H04L 12/5601 |
| | | | 370/412 |
| 2004/0114588 A1* | 6/2004 | Bhaskaran | H04L 49/552 |
| | | | 370/389 |
| 2004/0252710 A1* | 12/2004 | Jeter, Jr. | H04L 12/4604 |
| | | | 370/412 |
| 2006/0221823 A1* | 10/2006 | Shoham | H04L 49/90 |
| | | | 370/229 |
| 2008/0295088 A1* | 11/2008 | Bhat | G06F 8/67 |
| | | | 717/170 |
| 2009/0248992 A1* | 10/2009 | Sajayan | G06F 12/0862 |
| | | | 711/147 |
| 2010/0070695 A1* | 3/2010 | Baek | G06F 12/023 |
| | | | 711/104 |
| 2010/0115196 A1* | 5/2010 | Hamilton | G06F 13/4027 |
| | | | 711/108 |
| 2010/0281221 A1* | 11/2010 | Cantin | G06F 12/0813 |
| | | | 711/132 |
| 2010/0306405 A1 | 12/2010 | Galles | |
| 2011/0173369 A1* | 7/2011 | Julien | G06F 13/1684 |
| | | | 711/5 |
| 2011/0205897 A1* | 8/2011 | Pritam | H04L 47/10 |
| | | | 370/235 |
| 2011/0296078 A1* | 12/2011 | Khan | G06F 9/54 |
| | | | 711/5 |
| 2011/0296120 A1* | 12/2011 | Khan | G06F 9/54 |
| | | | 711/155 |
| 2011/0296415 A1* | 12/2011 | Khan | G06F 9/544 |
| | | | 718/100 |
| 2012/0173841 A1* | 7/2012 | Meier | G06F 12/1009 |
| | | | 711/202 |
| 2013/0290945 A1* | 10/2013 | Sawal | G06F 8/67 |
| | | | 717/168 |
| 2014/0149981 A1* | 5/2014 | Luxenberg | G06F 9/45533 |
| | | | 718/1 |
| 2015/0067086 A1* | 3/2015 | Adriaens | H04L 67/1097 |
| | | | 709/212 |
| 2015/0144774 A1* | 5/2015 | Fritsch | G01D 5/26 |
| | | | 250/231.1 |
| 2015/0150145 A1* | 5/2015 | Jones | G06F 21/79 |
| | | | 726/27 |

* cited by examiner

DYNAMIC TEMPORARY USE OF PACKET MEMORY AS RESOURCE MEMORY

TECHNICAL FIELD

The present disclosure relates generally to forwarding packets in a communications network.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology. From time to time, the software running in packet switching devices needs to be upgraded. However, the upgrade process consumes many resources of the packet switching device. In some instances, the entire packet switch device (or portions thereof) are taken offline in performing the system upgrade.

BRIEF DESCRIPTION OF THE DRAWINGS

The appended claims set forth the features of one or more embodiments with particularity. The embodiment(s), together with its advantages, may be best understood from the following detailed description taken in conjunction with the accompanying drawings of which:

DESCRIPTION OF EXAMPLE EMBODIMENTS

1. Overview

Figure 1:
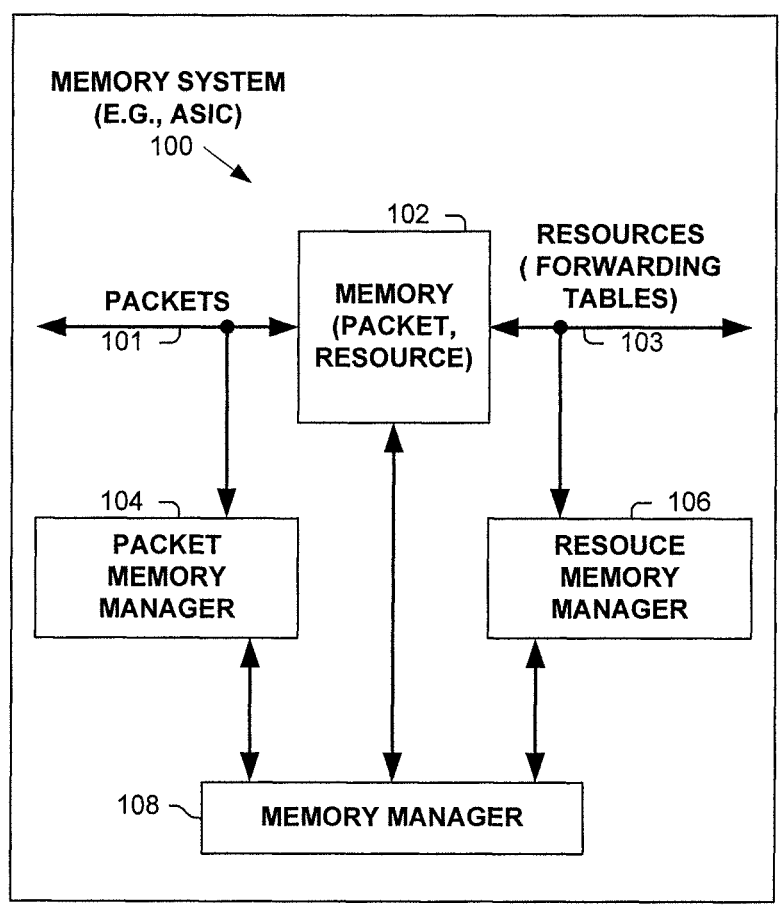
FIG. 1 illustrates a memory system according to one embodiment.

Disclosed are, inter alia, methods, apparatus, computer-storage media, mechanisms, and means associated with dynamic temporary use of packet memory as resource memory. In one embodiment, packets are buffered in packet memory of memory of a packet switching device, with said memory also including resource memory. The packet memory and resource memory are independently managed (e.g., each individually allocates portions of their respective assigned memory). The packet memory includes multiple packet memory regions of memory and is typically sized to accommodate peak burst rate packet traffic. The resource memory stores forwarding information and is used to forward buffered packets. While this packet buffering and forwarding is performed, one or more regions are acquired from the packet memory regions by a memory controller and assigned to be part of the resource memory. Thus, additional memory-intensive operations can be performed using the resource memory, which could not be performed prior to acquiring one or more packet memory regions. In one embodiment, these additional operations include in-service system upgrade of the packet switching device.

2. Description

Disclosed are, inter alia, methods, apparatus, computer-storage media, mechanisms, and means associated with dynamic temporary use of packet memory as resource memory. As used herein, packet memory refers to memory used to buffer packets; and resource memory refers to memory for other uses, such as, but not limited to, storing information for how to process (e.g., forward, modify) packets stored in packet memory.

Embodiments described herein include various elements and limitations, with no one element or limitation contemplated as being a critical element or limitation. Each of the claims individually recites an aspect of the embodiment in its entirety. Moreover, some embodiments described may include, but are not limited to, inter alia, systems, networks, integrated circuit chips, embedded processors, ASICs, methods, and computer-readable media containing instructions. One or multiple systems, devices, components, etc., may comprise one or more embodiments, which may include some elements or limitations of a claim being performed by the same or different systems, devices, components, etc. A processing element may be a general processor, task-specific processor, a core of one or more processors, or other co-located, resource-sharing implementation for performing the corresponding processing. The embodiments described hereinafter embody various aspects and configurations, with the figures illustrating exemplary and non-limiting configurations. Computer-readable media and means for performing methods and processing block operations (e.g., a processor and memory or other apparatus configured to perform such operations) are disclosed and are in keeping with the extensible scope of the embodiments. The term "apparatus" is used consistently herein with its common definition of an appliance or device.

The steps, connections, and processing of signals and information illustrated in the figures, including, but not limited to, any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process said read value—the value must be obtained prior to processing it, although some of the associated processing may be performed prior to, concurrently with, and/or after the read operation). Also, nothing described or referenced in this document is admitted as prior art to this application unless explicitly so stated.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the terms "first," "second," etc., are typically used herein to denote different units (e.g., a first element, a second element). The use of these terms herein does not necessarily connote an ordering such as one unit or event occurring or coming before another, but rather provides a mechanism to distinguish between particular units. Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps. Finally, the term "particular machine," when recited in a method claim for performing steps, refers to a particular machine within the 35 USC §101 machine statutory class.

One embodiment includes a method, comprising: buffering packets in packet memory of memory of a packet switching device, with said memory including resource memory, with said packet memory and said resource memory being independently managed, and with said packet memory including a plurality of packet memory regions of memory; using forwarding information stored in the resource memory to forward packets of said buffered packets; and in response to a condition and while said buffering packets and said using forwarding information stored in the resource memory to forward said buffered packets: acquiring one or more regions from the plurality of packet memory regions by a memory controller, assigning said acquired packet memory regions to be part of said resource memory, performing additional operations using said resource memory including said acquired packet memory, and subsequent to said performing additional operations, acquiring a portion of the resource memory by the memory controller and assigning said acquired portion of the resource memory to said packet memory with said buffering packets including buffering packets in said packet memory including said assigned acquired portion of the resource memory.

In one embodiment, said additional operations include in-service system upgrade of the packet switching device. In one embodiment, said assigning said acquired packet memory regions to be part of said resource memory at least doubles the used prior amount of said resource memory. In one embodiment, said in-service system upgrade of the packet switching device is performed with zero packet loss. In one embodiment, said packet memory including the plurality of packet memory regions of memory is sized to accommodate peak burst rate packet traffic; and wherein said packet memory without said acquired packet memory regions cannot accommodate said peak burst rate packet traffic. In one embodiment, said acquiring one or more regions from the plurality of packet memory regions by a memory controller includes adjusting the packet distribution of said buffering packets in packet memory to stop buffering packets in a portion of said packet memory including said one or more regions of the plurality of packet memory regions such that by attrition of removing one or more packets there are no packets stored in said one or more regions of the plurality of packet memory regions.

In one embodiment, said packet memory including the plurality of packet memory regions of memory is sized to accommodate peak burst rate packet traffic; and wherein said packet memory without said acquired packet memory regions cannot accommodate said peak burst rate packet traffic. In one embodiment, said acquiring one or more regions from the plurality of packet memory regions by a memory controller includes adjusting the packet distribution of said buffering packets in packet memory to stop buffering packets in a portion of said packet memory including said one or more regions of the plurality of packet memory regions such that by attrition of removing one or more packets there are no packets stored in said one or more regions of the plurality of packet memory regions. In one embodiment, wherein said acquiring one or more regions from the plurality of packet memory regions by a memory controller includes adjusting the packet distribution of said buffering packets in packet memory to stop buffering packets in a portion of said packet memory including said one or more regions of the plurality of packet memory regions, and after a subsequent predetermined time moving one or more remaining packets such that there are no packets stored in said one or more regions of the plurality of packet memory regions.

In one embodiment, said memory is located on a line card of the packet switching device. In one embodiment, one or more regions from the plurality of packet memory regions consists of a single region. In one embodiment, said acquiring one or more regions from the plurality of packet memory regions by a memory controller includes concentrating packets of said buffering packets in regions other than one or more regions of the plurality of packet memory regions. In one embodiment, said acquiring one or more regions from the plurality of packet memory regions by a memory controller includes designating said one or more regions of the plurality of packet memory regions. In one embodiment, said acquiring one or more regions from the plurality of packet memory regions by a memory controller includes designating said one or more regions of the plurality of packet memory regions based on an age or utilization metric of said one or more regions. In one embodiment, said buffering packets sparsely populates each region currently assigned to said packet memory. In one embodiment, said memory is located on a single memory system application-specific integrated circuit (ASIC).

One embodiment includes a packet switching device, comprising: a packet switching mechanism configured to packet switch packets within the packet switching device; a route processor, including at least one processing element, communicatively coupled to the packet switching mechanism; a plurality of line cards, with each line card of the plurality of line cards communicatively coupled to the packet switching mechanism and including: memory comprising independently managed packet memory and resource memory, with said packet memory configured to buffer packets and including a plurality of packet memory regions of memory with a total size to accommodate peak burst rate packet traffic; and one or more packet processors configured to use forwarding information stored in the resource memory to forward packets of said buffered packets; and a memory manager configured to perform operations without causing packet loss including to acquire one or more regions from the plurality of packet memory regions, assign said acquired packet memory regions to be part of said resource memory, and to return said acquired packet memory regions to the plurality of packet memory regions.

In one embodiment, said configuration to return said acquired packet memory regions to the plurality of packet memory regions is responsive to an in-service system upgrade of the packet switching device using said resource memory which could not be performed with the size of resource memory prior to said assignment of said acquired packet memory regions to be part of said resource memory.

One embodiment includes a method, comprising: buffering packets in packet memory of memory on a single integrated circuit of a packet switching device, with said memory including resource memory, with said packet memory and said resource memory being independently managed, and with said packet memory including a plurality of packet memory regions of memory and sized to accommodate peak burst rate packet traffic, with said buffering packets including distributing packets throughout currently assigned regions to said packet memory; using forwarding information stored in the resource memory to forward packets of said buffered packets; and while said buffering packets and said using forwarding information stored in the resource memory to forward said buffered packets: acquiring one or more regions from the plurality of packet memory regions by a memory controller, assigning said acquired packet memory regions to be part of said resource memory, and performing additional operations using said resource memory including said acquired packet memory.

In one embodiment, said additional operations include in-service system upgrade of the packet switching device which could not be performed with the size of resource memory prior to said assignment of said acquired packet memory regions to be part of said resource memory.

FIG. 1 illustrates a memory system 100 according to one embodiment. In one embodiment, memory system 100 is implemented on an application-specific integrated circuit (ASIC). As shown, memory system 100 includes memory 102 (e.g., one or more physical memories with same or different latencies, on-ASIC memory such as SRAM and/or off-ASIC memory such as DRAM), which includes both packet memory and resource memory. Packet memory is used to buffer packets (101) (e.g., store and retrieve, enqueue and dequeue), which typically includes the packets themselves, as well as data structures associated with buffering of packets. Memory 100 also includes resource memory, which includes data structures (e.g., forwarding information bases or tables) associated with storing and retrieving forwarding information (103) (e.g., how to forward a particular packet based on a lookup operation based on information, such as a destination address or label, contained in a header of a packet).

Albeit part of the same memory 102, packet memory and resource memory are independently managed by packet memory manager 104 and resource memory manager 106, respectively. In other words, each memory manager 104 and 106 is assigned regions of memory 102 by memory manager 108, with each of packet memory manager 104 and resource memory manager 106 managing their respective regions of memory.

Packet memory 101 is typically initially sized to accommodate peak burst rate packet traffic so that no packet is dropped due to lack of packet buffering resources. To accommodate this storage and retrieval rate, packets are often distributed throughout the assigned packet memory such that regions are often sparsely populated. The unpredictable arrival of live packet traffic and packet scheduling mechanisms of the packet switching device further effect the distribution of packets in packet memory (e.g., the order of retrieving packets is often different than the order of storing packets). To avoid issues, packet memory of prior systems was statically sized to accommodate worst-case arrival rate traffic for the duration of the operation of the packet switching device.

Resource memory 106 is sized to accommodate its data structures, which includes information stored therein. In prior systems, however, resource memory is sized to at least twice its required normal-operating amount so that when an in-service upgrade of the packet switching device was performed, unused resource memory was available to basically duplicate and store according to the new version of the packet switching device the information contained in the data structures prior to the system upgrade.

To overcome this extra overhead of often unused resource memory, one embodiment dynamically collects fragments of packet memory stored in packet memory to form a contiguous region of memory that can be used by resource memory in a memory system that is shared between many clients in a routing complex. One embodiment reassigns a contiguous region no longer used by packet memory to resource memory, and vice versa from resource memory to packet memory, dynamically without packet loss or pause. During packet buffering, packet memory becomes fragmented due to the scheduling policies and congestion scenarios. One embodiment collects/defragments buffer memory to acquire a contiguous block that can be used for resource memory.

Figure 2:
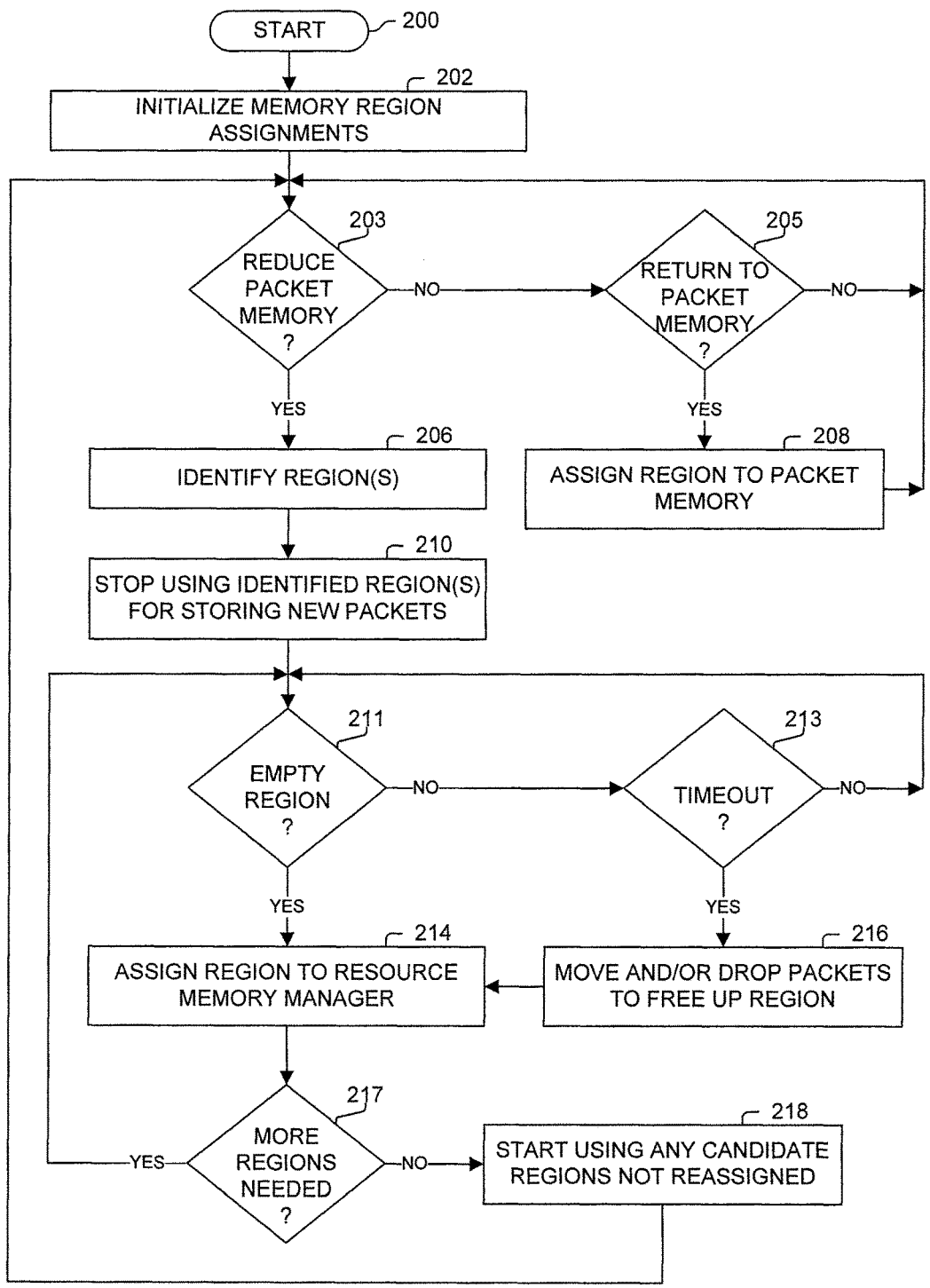
FIG. 2 illustrates a process according to one embodiment.

One such embodiment associated with dynamic temporary use of packet memory as resource memory performs the processing illustrated by the flow diagram of FIG. 2. Processing begins with process block 200. In process block 202, memory regions are initially assigned in appropriate normal operating sizes to packet memory and to resource memory (e.g., individual, non-cooperating memory systems). A determination of whether to reduce the packet memory size (e.g., to make available one or more regions of packet memory to resource memory) is made in process block 203. If so, processing continues to process block 206; otherwise processing continues to process block 205. As determined in process block 205, if one or more regions of memory currently assigned to resource memory are no longer need, these one or more regions are reassigned to packet memory (e.g., no longer assigned to resource memory) in process block 208, with processing returning to process block 203.

In response to the determination in process block 203 to reduce the packet memory size to make available one or more regions of packet memory to resource memory, processing continues to process block 206, wherein one or more candidate memory regions are identified. In one embodiment, a candidate region is selected based on a usage metric (e.g., current utilization, time of oldest or last-written packet, average age, traffic history) or using some other basis (e.g., random, round robin). In process block 210, packets are no longer buffered in the one or more candidate regions, in order to acquire an empty packet memory region.

In one embodiment, this empty packet memory region is acquired based on attrition and according to normal traffic patterns. However, it may be necessary to move some residual packets from a region of memory to free up an entire region of packet memory. Therefore one embodiment continues processing with a determination in process block 211 of whether one of the one or more candidate regions are empty. If so, then processing continues to process block 214; otherwise processing proceeds to process block 213. As determined in process block 213, if a timeout has occurred (e.g., a predetermined duration has occurred without a candidate region being freed), then in process block 216, packets are moved from one of the candidate regions. In process block 214, the freed packet memory region (either by attrition or with some moving of packets to other packet memory regions) is reassigned from the packet memory manager to the resource memory manager and used as resource memory. As determined in process block 217, if more regions are needed by the resource memory manager, then processing returns to process block 203. Otherwise in process block 218, any remaining candidate regions are used for buffering packets again, with processing returning to process block 203.

Figure 3A:
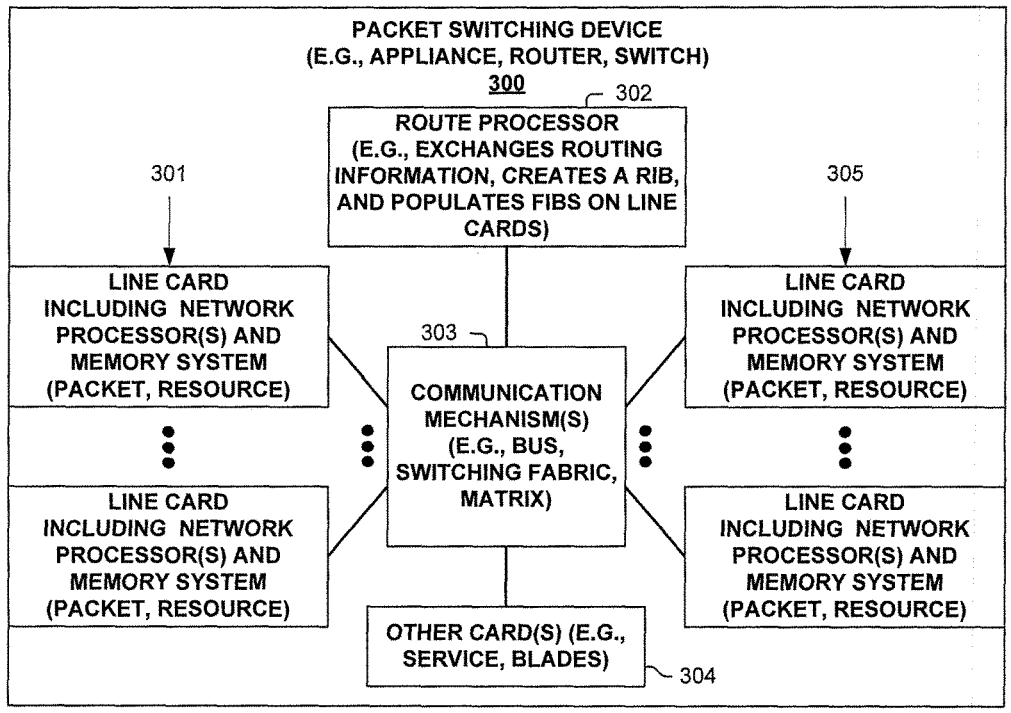
FIG. 3A illustrates a packet switching device according to one embodiment.

One embodiment of a packet switching device 300 is illustrated in FIG. 3A. As shown, packet switching device 300 includes multiple line cards 301 and 305, each with one or more network interfaces for sending and receiving packets over communications links (e.g., possibly part of a link aggregation group), memory (e.g., assigned between packet memory and resource memory) and with one or more processing elements that are used in one embodiment associated with dynamic temporary use of packet memory as resource memory. Line cards 301 and 305 typically perform the actions of being both an ingress and egress line card, in regards to multiple other particular packets and/or packet streams being received by, or sent from, packet switching device 300.

Packet switching device 300 also has a control plane with a route processor 302 (e.g., board with processing elements) for managing the control plane and/or control plane processing of packets associated with dynamic temporary use of packet memory as resource memory. Packet switching device 300 also includes other cards 304 (e.g., service cards, blades) which include processing elements that are used in one embodiment to process packets associated with dynamic temporary use of packet memory as resource memory, and some communication mechanism 303 (e.g., bus, switching fabric, matrix) for allowing its different entities 301, 302, 304 and 305 to communicate.

Figure 3B:
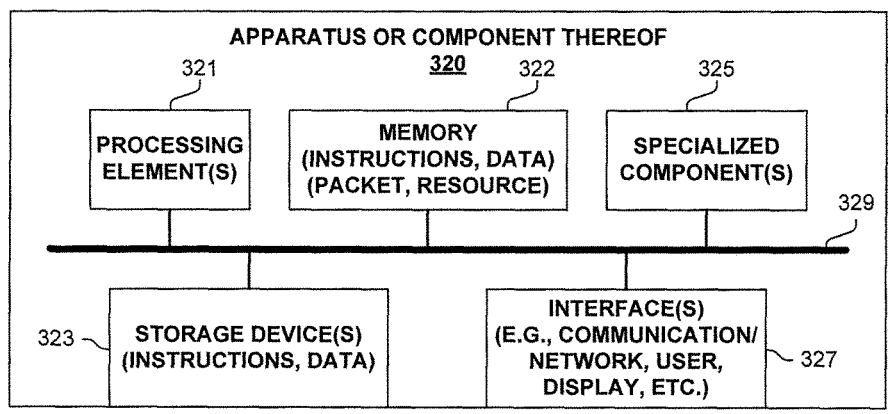
FIG. 3B illustrates an apparatus according to one embodiment.

FIG. 3B is a block diagram of an apparatus 320 used in one embodiment associated with dynamic temporary use of packet memory as resource memory. In one embodiment, apparatus 320 performs one or more processes (which may include synchronization processing), or portions thereof, corresponding to one of the flow diagrams illustrated or otherwise described herein, and/or illustrated in another diagram or otherwise described herein.

In one embodiment, apparatus 320 includes one or more processing element(s) 321, memory 322 (e.g., including packet memory and resource memory), storage device(s) 323, specialized component(s) 325 (e.g. optimized hardware such as for performing lookup and/or packet processing operations, etc.), and interface(s) 327 for communicating information (e.g., sending and receiving packets, user-interfaces, displaying information, etc.), which are typically communicatively coupled via one or more communications mechanisms 329, with the communications paths typically tailored to meet the needs of a particular application.

Various embodiments of apparatus 320 may include more or fewer elements. The operation of apparatus 320 is typically controlled by processing element(s) 321 using memory 322 and storage device(s) 323 to perform one or more tasks or processes. Memory 322 is one type of computer-readable/computer-storage medium, and typically comprises random access memory (RAM), read only memory (ROM), flash memory, integrated circuits, and/or other memory components. Memory 322 typically stores computer-executable instructions to be executed by processing element(s) 321 and/or data which is manipulated by processing element(s) 321 for implementing functionality in accordance with an embodiment. Storage device(s) 323 are another type of computer-readable medium, and typically comprise solid state storage media, disk drives, diskettes, networked services, tape drives, and other storage devices. Storage device(s) 323 typically store computer-executable instructions to be executed by processing element(s) 321 and/or data which is manipulated by processing element(s) 321 for implementing functionality in accordance with an embodiment.

Figure 4:
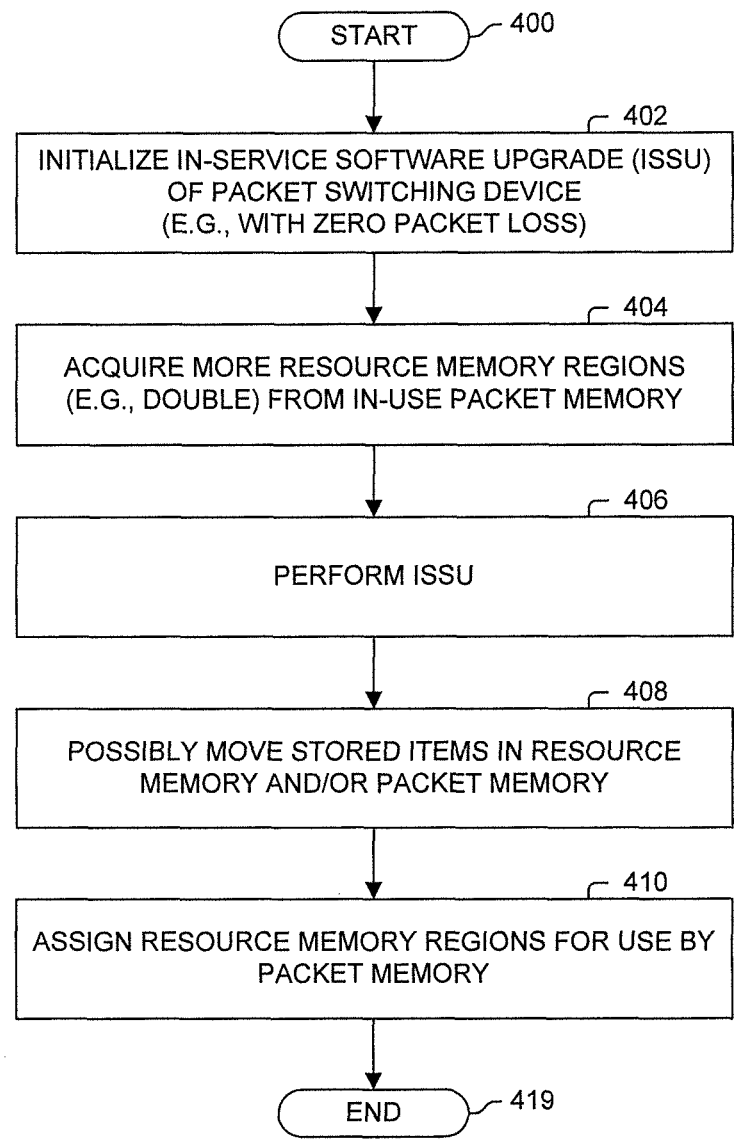
FIG. 4 illustrates a process according to one embodiment.

FIG. 4 illustrates an in-service system upgrade (ISSU) process performed in one embodiment. Processing begins with process block 400. In process block 402, the ISSU process is initialized. In process block 404, one or more memory regions are acquired from packet memory (e.g., by the process illustrated by FIG. 2 or otherwise herein), and reassigned for use by resource memory. In one embodiment, the number of regions of the resource memory or the used prior amount of resource memory is approximately doubled to accommodate storage requirements for two versions simultaneously occupying the resource memory. In one embodiment, the size of resource memory is adjusted to requirements for performing ISSU which may different than simply doubling the number of memory regions. In process block 406, the packet switching device is updated while in service, typically without packet loss. In process block 408, stored items are possibly moved within resource memory and/or within packet memory, such as, but not limited to use more advantageous memory and/or to free up an entire region of memory.

In one embodiment, memory includes both lower-latency on-ASIC memory (e.g., SRAM) and higher-latency off-ASIC memory (e.g., DRAM). At least a majority of resource memory is typically located in the on-ASIC memory, while at least a majority of packet memory is typically located in the off-ASIC memory. The on-ASIC memory may not have enough capacity for the ISSU. Thus, some off-ASIC memory is assigned to packet memory (e.g., in process block 404) and used to store the new version of resource data structures, etc. After ISSU, these resource items stored in off-ASIC memory are moved to the lower-latency on-ASIC memory to enable faster packet processing operations, and freeing up off-ASIC memory rather than on-ASIC memory.

In process block 410, one or more resource memory regions no longer required by resource memory (e.g., at least one of the resource memory region(s) not used by the new version) are assigned to packet memory. In one embodiment, the same acquired regions and/or the same number of acquired regions in process block 404 are assigned to packet memory. Processing of the flow diagram of FIG. 4 is complete as indicated by process block 419.

In view of the many possible embodiments to which the principles of the disclosure may be applied, it will be appreciated that the embodiments and aspects thereof described herein with respect to the drawings/figures are only illustrative and should not be taken as limiting the scope of the disclosure. For example, and as would be apparent to one skilled in the art, many of the process block operations can be re-ordered to be performed before, after, or substantially concurrent with other operations. Also, many different forms of data structures could be used in various embodiments. The disclosure as described herein contemplates all such embodiments as may come within the scope of the following claims and equivalents thereof.

What is claimed is:

1. A method, comprising:

overall managing physical memory of a packet switching device by a memory manager, with said memory including packet memory and resource memory referring to different dynamically sized different regions of said memory, with said packet memory including a plurality of packet memory regions of said memory;

independently managing said packet memory by a packet memory manager, including the packet memory manager receiving from and releasing to the memory manager portions of said packet memory and allocating portions of said packet memory for storage of packets;

independently managing said resource memory by the resource memory manager, including the resource memory manager receiving from and releasing to the memory manager portions of said resource memory and allocating portions of said resource memory for storage of forwarding information;

buffering packets in said packet memory;

using said forwarding information stored in the resource memory in forwarding packets of said buffered packets;

in response to a condition to increase said resource memory managed by said resource memory manager from said packet memory managed by said packet memory manager and while said buffering packets and said using said forwarding information stored in the resource memory in forwarding said buffered packets: acquiring one or more regions from the plurality of packet memory regions by the memory manager, assigning said acquired packet memory regions to be part of said resource memory said managed by the resource memory manager, and performing additional operations using said resource memory including said acquired packet memory regions;

in-service system upgrade of the packet switching device using said resource memory which could not be performed with the size of resource memory prior to said assignment of said acquired packet memory regions to be part of said resource memory; and subsequent to said performing additional operations, acquiring a portion of the resource memory by the memory manager and assigning said acquired portion of the resource memory to said packet memory said managed by the packet memory manager with said buffering packets including buffering packets in said packet memory including said assigned acquired portion of the resource memory.

2. The method of claim 1, wherein said assigning said acquired packet memory regions to be part of said resource memory at least doubles the used prior amount of said resource memory.

3. The method of claim 1, wherein said in-service system upgrade of the packet switching device is performed with zero packet loss.

4. The method of claim 3, wherein said packet memory including the plurality of packet memory regions of memory is sized to accommodate peak burst rate packet traffic; and wherein said packet memory without said acquired packet memory regions cannot accommodate said peak burst rate packet traffic.

5. The method of claim 4, wherein said acquiring one or more regions from the plurality of packet memory regions by the memory manager includes adjusting the packet distribution of said buffering packets in said packet memory to stop buffering packets in a portion of said packet memory including said one or more regions of the plurality of packet memory regions such that by attrition of removing one or more packets there are no packets stored in said one or more regions of the plurality of packet memory regions.

6. The method of claim 1, wherein said packet memory including the plurality of packet memory regions of memory is sized to accommodate peak burst rate packet traffic; and wherein said packet memory without said acquired packet memory regions cannot accommodate said peak burst rate packet traffic.

7. The method of claim 1, wherein said acquiring one or more regions from the plurality of packet memory regions by the memory manager includes adjusting the packet distribution of said buffering packets in said packet memory to stop buffering packets in a portion of said packet memory including said one or more regions of the plurality of packet memory regions such that by attrition of removing one or more packets there are no packets stored in said one or more regions of the plurality of packet memory regions.

8. The method of claim 1, wherein said acquiring one or more regions from the plurality of packet memory regions by the memory manager includes adjusting the packet distribution of said buffering packets in said packet memory to stop buffering packets in a portion of said packet memory including said one or more regions of the plurality of packet memory regions, and after a subsequent predetermined time and in order to proceed with said acquiring one or more regions from the plurality of packet memory regions relocating one or more remaining packets of said buffered packets within said packet memory from said one or more regions of the plurality of packet memory regions such that there are no packets stored in said one or more regions of the plurality of packet memory regions.

9. The method of claim 1, wherein said memory is located on a line card of the packet switching device.

10. The method of claim 1, wherein one or more regions from the plurality of packet memory regions consists of a single region.

11. The method of claim 1, wherein said acquiring one or more regions from the plurality of packet memory regions by the memory manager includes concentrating packets of said buffering packets in regions other than one or more regions of the plurality of packet memory regions.

12. The method of claim 1, wherein said acquiring one or more regions from the plurality of packet memory regions by the memory manager includes designating said one or more regions of the plurality of packet memory regions.

13. The method of claim 1, wherein said acquiring one or more regions from the plurality of packet memory regions by the memory manager includes designating said one or more regions of the plurality of packet memory regions based on an age or utilization metric of said one or more regions.

14. The method of claim 1, wherein said buffering packets sparsely populates each region currently assigned to said packet memory.

15. The method of claim 1, wherein said memory is located on a single memory system application-specific integrated circuit (ASIC).

16. A memory system, including:

physical memory of an apparatus, with said memory including packet memory and resource memory referring to different dynamically sized different regions of said memory, with said packet memory including a plurality of packet memory regions of said memory, with said packet memory buffering packets, and with said resource memory storing information for how to process packets of said buffered packets;

a memory manager overall managing said memory;

a packet memory manger independently managing said packet memory, including the packet memory manager receiving from and releasing to the memory manager portions of said packet memory and allocating portions of said packet memory for storage of packets; and a resource memory manager independently managing said resource memory, including the resource memory manager receiving from and releasing to the memory manager portions of said resource memory and allocating portions of said resource memory for storage of forwarding information;

wherein in response to a first condition to increase said resource memory managed by said resource memory manager from said packet memory managed by said packet memory manager and while said packet memory buffering packets and said resource memory storing information for how to process packets of said buffered packets, the memory manager acquires one or more regions from the plurality of packet memory regions and assigns said acquired one or more regions from the plurality of packet memory regions to be part of said resource memory said managed by the resource memory manager providing a large enough said resource memory used by an in-service system upgrade of the apparatus which could not be performed with the size of resource memory prior to said assignment of said acquired packet memory regions to be part of said resource memory; and wherein in response to a second condition to increase said packet memory managed by said packet memory manager from said resource memory managed by said resource memory manager and while said packet memory buffering packets and said resource memory storing information for how to process packets of said buffered packets, the memory manager acquires a portion of the resource memory and assigns said acquired portion of the resource memory to said packet memory said managed by the packet memory manager.

17. A method, comprising:

independently managing packet memory of physical memory of an apparatus by a packet memory manager, including the packet memory manager receiving and releasing portions of said packet memory and allocating portions of said packet memory for storage of packets, with said packet memory including a plurality of packet memory regions of said memory;

independently managing resource memory of said physical memory by a resource memory manager, including the resource memory manager receiving and releasing portions of said resource memory and allocating portions of said resource memory for storage of forwarding information, with said packet memory and said resource memory referring to different dynamically sized different regions of said memory;

buffering packets in said packet memory;

processing packets of said buffered packets according to processing information stored in the resource memory;

in response to a condition to increase said resource memory managed by said resource memory manager from said packet memory managed by said packet memory manager and while said buffering packets and said processing packets: one or more regions are acquired from the plurality of packet memory regions and assigned to be part of said resource memory said managed by the resource memory manager, and additional operations are performed using said resource memory including said acquired packet memory regions;

in-service system upgrade of the packet switching device using said resource memory which could not be performed with the size of resource memory prior to said assignment of said acquired packet memory regions to be part of said resource memory; and subsequent to said performing additional operations, a portion of the resource memory is acquired and assigned to said packet memory said managed by the packet memory manager, with said buffering packets including buffering packets in said packet memory including said assigned acquired portion of the resource memory.

18. The method of claim 17, wherein said acquiring one or more regions from the plurality of packet memory regions includes adjusting the packet distribution of said buffering packets in said packet memory said managed by the packet memory manager to stop buffering packets in a portion of said packet memory including said one or more regions of the plurality of packet memory regions such that by attrition of removing one or more packets there are no packets stored in said one or more regions of the plurality of packet memory regions.

19. The method of claim 17, wherein said acquiring one or more regions from the plurality of packet memory regions includes relocating one or more of said buffered packets within said packet memory said managed by the packet memory manager from said one or more regions of the plurality of packet memory regions resulting in no packets being stored in said one or more regions of the plurality of packet memory regions.

* * * * *